(12) United States Patent
Munige et al.

(10) Patent No.: US 11,237,324 B2
(45) Date of Patent: Feb. 1, 2022

(54) FEW MODE OPTICAL FIBER

(71) Applicant: Sterlite Technologies Limited, Gurgaon (IN)

(72) Inventors: Srinivas Reddy Munige, Gurgaon (IN); Anand Pandey, Gurgaon (IN)

(73) Assignee: STERLITE TECHNOLOGIES LIMITED, Gurgaon (IN)

( * ) Notice: Subject to any disclaimer, the term of this patent is extended or adjusted under 35 U.S.C. 154(b) by 0 days.

(21) Appl. No.: 17/162,948

(22) Filed: Jan. 29, 2021

(65) Prior Publication Data
US 2021/0239899 A1 Aug. 5, 2021

(30) Foreign Application Priority Data

Jan. 31, 2020 (IN) .............................. 202011004399

(51) Int. Cl.
G02B 6/028 (2006.01)
G02B 6/036 (2006.01)
H04J 14/04 (2006.01)

(52) U.S. Cl.
CPC ......... G02B 6/0288 (2013.01); G02B 6/0281 (2013.01); G02B 6/036 (2013.01); H04J 14/04 (2013.01); *G02B 6/0365* (2013.01)

(58) Field of Classification Search
None
See application file for complete search history.

(56) References Cited

U.S. PATENT DOCUMENTS

| | | | | |
|---|---|---|---|---|
| 8,705,922 B2 * | 4/2014 | Bickham | ............ | G02B 6/03627 385/124 |
| 8,842,957 B2 * | 9/2014 | Bickham | .............. | G02B 6/0288 385/124 |
| 10,007,055 B2 * | 6/2018 | Sillard | ..................... | H04J 14/00 |
| 10,520,670 B2 * | 12/2019 | Munige | .............. | G02B 6/02042 |
| 10,557,986 B2 * | 2/2020 | Munige | .............. | G02B 6/02261 |

FOREIGN PATENT DOCUMENTS

| CN | 105683790 B | * | 3/2019 | ......... G02B 6/03627 |
|---|---|---|---|---|
| EP | 3141938 A1 | * | 3/2017 | ......... G02B 6/03666 |
| EP | 2817665 B1 | * | 12/2018 | ........... G02B 6/0365 |
| WO | WO-2017137793 A1 | * | 8/2017 | .............. H04J 14/04 |

* cited by examiner

*Primary Examiner* — Michelle R Connelly

(57) ABSTRACT

The present disclosure provides a few mode optical fiber (100). The few mode optical fiber (100) includes a core (102). The core (102) defined by a region around a central longitudinal axis (112) of the few mode optical fiber (100). In addition, the core (102) has a super gaussian refractive index profile with curve parameter gamma ∟ and rescale factor (a). In addition, the core (102) has a first annular region (104) extended from central longitudinal axis (112) of the few mode optical fiber (100) to radius $r_1$. Further, the core (102) has a second annular region (106) extended from radius $r_1$ to radius $r_2$. Furthermore, the core (102) has a third annular region (108) extended from radius $r_2$ to radius $r_3$. In addition, the few mode optical fiber (100) has a cladding (110) extended from radius $r_3$ to radius $r_4$.

7 Claims, 2 Drawing Sheets

FEW MODE OPTICAL FIBER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fiber transmission. More particularly, the present disclosure relates to dispersion controlled few mode optical fiber with minimal spatial overlap between Lp01 and Lp11 guiding modes. The few mode optical fiber as described herein is suitable for space division multiplexing (SDM) applications.

Description of the Related Art

Over the last few years, optical fibers are being widely used for communications. The present day coherent communication systems use the dense wavelength division multiplexing techniques to transfer the data. Several coherent modulation techniques such as OOK or QPSK with single mode fibers have been used to increase the data rate capacity of the communication system by taking almost all the freedoms available in modulation schemes. The telecommunication industry is continuously striving for the designs to meet the exponential increase in the data rate capacity demand. The ongoing research suggests that the few mode fiber which can allow the light to travel more than one mode with spatial division multiplexing schemes can be a potential solution to increase the data rate by allowing the signal to transmit in more than one mode. Typically, the performance of these optical fibers is determined based on dispersion, intermodal crosstalk between guiding modes and bending losses over a wavelength. In general, the dispersion, intermodal crosstalk and bending losses are optimized based on a refractive index profile. The refractive index profile defines the properties of a core section and a cladding section. Also, the refractive index profile illustrates a relationship between the refractive index of the optical fiber with a radius of the optical fiber. Further, this profile is determined based on a concentration of dopants and materials used during manufacturing. Furthermore, the dispersion, intermodal crosstalk between modes and bending losses are controlled by varying the thickness of each region of the optical fiber.

In light of the above stated discussion, there is a need for a few mode optical fiber that overcomes the above sited drawbacks.

BRIEF SUMMARY OF THE INVENTION

In an aspect of the present disclosure, the present disclosure provides a few mode optical fiber. The few mode optical fiber includes a core. In addition, the few mode optical fiber includes a cladding. Further, the core of the few mode optical fiber includes a first annular region. The first annular region lies between the central longitudinal axis of the few mode optical fiber and a first radius $r_1$. In addition, the first annular region has a first relative refractive index $\Delta_1$. Further, the first radius $r_1$ is in range of about 14 microns to 16 microns and the first relative refractive index $\Delta_1$ is in range of about 0.50 to 0.70. Furthermore, the first annular region has a super Gaussian profile. Further, the core of the few mode optical fiber includes a second annular region. The second annular region concentrically surrounds the first annular region. In addition, the second annular region lies in between the first radius $r_1$ and a second radius $r_2$, Further, the second annular region has a second relative refractive $\Delta_2$, Furthermore, the second radius $r_2$ is in a range of about 17 microns to 22 microns and the second relative refractive index $\Delta_2$ is in range of about −0.01 to 0.01. Furthermore, the core of the few mode optical fiber includes the third annular region. The third annular region concentrically surrounds the second annular region. In addition, the third annular region lies between the second radius $r_2$ and a third radius $r_3$. Further, the third annular region has a third relative refractive index $\Delta_3$, Furthermore, the third radius $r_3$ is in the range of about 24 microns to 30 microns. Moreover, the third relative refractive index $\Delta_3$ is in range of about −0.27 to −0.32. Moreover, the fourth radius $r_4$ is in range of about 62.2 microns to 62.8 microns.

A primary object of the present disclosure is to provide a few mode optical fiber for increasing data rate of transmission.

Another object of the present disclosure is to provide the few mode optical fiber for operating in LP01 guided mode and LP11 guided mode.

Yet another object of the present disclosure is to provide the few mode optical fiber with low bending loss.

Yet another object of the present disclosure is to provide the few mode optical fiber with low differential group delay between LP01 guided mode and LP11 guided mode.

Yet another object of the present disclosure is to provide the few mode optical fiber having difference between effective refractive indices of the Lp01 guided mode and Lp11 guided mode maintained in such a way that it suppress the cross talk.

Yet another object of the present disclosure is to provide the few mode optical fiber suitable for spatial division multiplexing applications.

In an embodiment of the present disclosure, the few mode optical fiber includes the first annular region. The first annular region is central core region having super Gaussian profile. In addition, the first annular region includes, parameter rescale factor (a) in range of about 6.6 microns to 7.2 microns, curve parameter L (gamma) in the range of about 4 to 8.

In an embodiment of the present disclosure, the few mode optical fiber has a dispersion of about 13 picosecond/(nanometer-kilometer) to 16 picosecond/(nanometer-kilometer) for LP11 guided mode at a wavelength of 1550 nanometer.

In an embodiment of the present disclosure, the few mode optical fiber has a dispersion of 18 picosecond/(nanometer-kilometer) to 23 picosecond/(nanometer-kilometer) for LP01 guided mode at a wavelength of 1550 nanometer.

In an embodiment of the present disclosure, the few mode optical fiber has a cutoff wavelength. The cutoff wavelength for LP11 guided mode is up to 2400 nanometer.

In an embodiment of the present disclosure, the few mode optical fiber has a cutoff wavelength. The cut off wavelength for LP02 mode is up to 1600 nanometer.

In an embodiment of the present disclosure, the few mode optical fiber has a differential group delay. The differential group delay between LP01 guided mode and LP11 guided mode is up to 1 nanosecond/kilometer at a wavelength of 1550 nanometer.

In an embodiment of the present disclosure, the few mode optical fiber has a difference between effective refractive indices of two guided modes. The effective refractive index difference between LP01 guided mode and LP11 guided mode is greater than $10^{-3}$ nanosecond/kilometer at a wavelength of 1550 nanometer.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
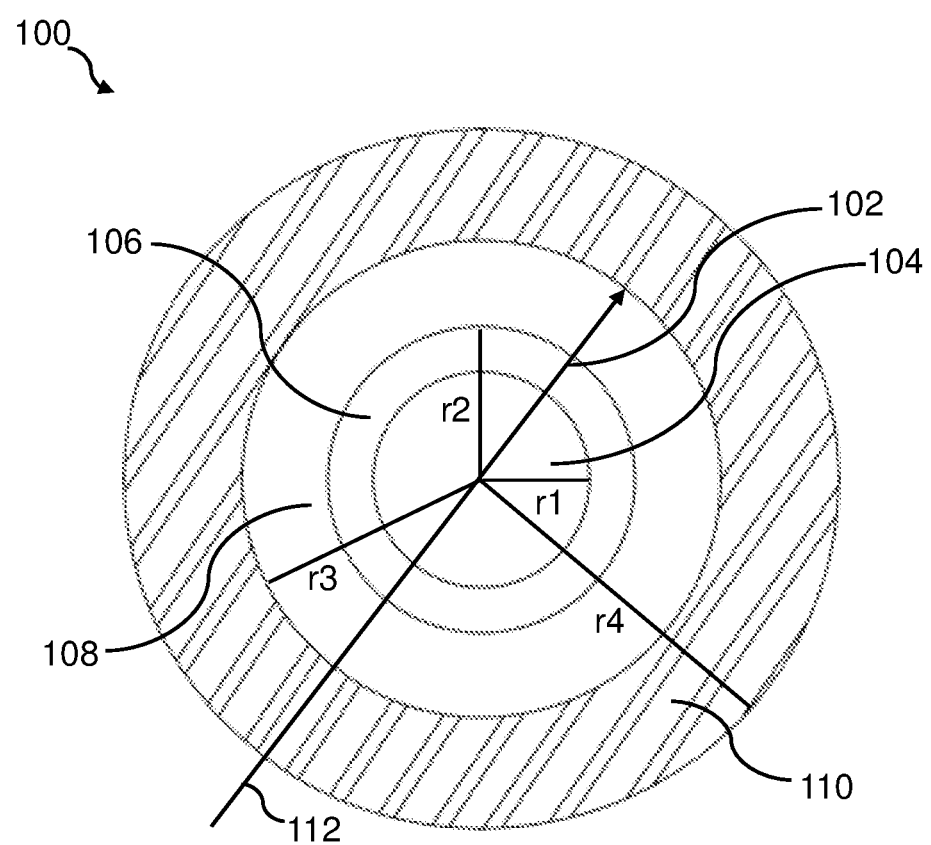
FIG. 1 illustrates a cross-sectional view of a few mode optical fiber, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Few mode optical fiber.
102. Core.
104. First annular region.
106. Second annular region.
108. Third annular region.
110. The cladding.
112. Central longitudinal axis.
200. Refractive index profile.
$\Delta_1$. First relative refractive index.
$\Delta_2$. Second relative refractive index.
$\Delta_3$. Third relative refractive index.
$\Delta_4$. Fourth relative refractive index.
$r_1$. First radius.
$r_2$. Second radius.
$r_3$. Third radius.
$r_4$. Fourth radius.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of a few mode optical fiber 100, in accordance with various embodiments of the present disclosure. The few mode optical fiber 100 includes a core 102. The core 102 includes a first annular region 104, a second annular region 106 and a third annular region 108. In addition, the first annular region 104, the second annular region 106 and the third annular region 108 are concentrically arranged. Further, the first annular region 104 is defined by region around a central longitudinal axis 112. Furthermore, the second annular region 106 concentrically surrounds the first annular region 104. Moreover, the third annular region 108 concentrically surrounds the second annular region 106. Also, the few mode optical fiber 100 includes a cladding 110. The cladding 110 concentrically surrounds the third annular region 108.

In general, optical fiber is a thin strand of glass or plastic capable of transmitting optical signals. The few mode optical fiber 100 allows light to travel in more than one mode. In addition, the few mode optical fiber 100 has high data transmission rate. Further, the few mode optical fiber 100 allows information to travel in more than one mode. Furthermore, the few mode optical fiber 100 is utilized for spatial division multiplexing applications. In general, spatial division multiplexing is a method to access channels by creating parallel spatial channel next to higher capacity channel. In an embodiment of the present disclosure, the few mode optical fiber 100 is operated in two guided modes. The two guided modes include LP01 and LP11.

Further, the core 102 and the cladding 110 is associated with a refractive index profile. In an embodiment of the present disclosure, the refractive index profile determines relationship between the refractive index of the few mode optical fiber 100 and radius of the few mode optical fiber 100. In general, refractive index is defined by ratio of velocity of light in vacuum to velocity of light in the specified medium. In addition, the refractive index profile is maintained as per a desired level based on a concentration of chemicals used for manufacturing of the few mode optical fiber 100. In an embodiment of the present disclosure, manufacturing of the few mode optical fiber 100 is carried out after construction of preform of the few mode optical fiber 100.

In addition, the refractive index profile of the few mode optical fiber 100 is determined during manufacturing of preform of the few mode optical fiber 100. In general, preform is piece of glass rod with small diameter in range of about 1 cm to 10 cm and length of about 1 m. In addition, preform is used to draw optical fiber. The refractive index profile is determined based on a concentration of chemicals used during the manufacturing of the preform of the few mode optical fiber 100. The chemicals used for manufacturing of the few mode optical fiber 100 include one or more materials and one or more dopants. Further, the one or more materials and the one or more dopants are deposited over a surface of an initial material with facilitation of flame hydrolysis. In an embodiment of the present disclosure, the initial material is a substrate rod or a tube.

The few mode optical fiber 100 includes a plurality of regions in the core 102 of the few mode optical fiber 100. In an embodiment of the present disclosure, the core 102 of the few mode optical fiber 100 is divided into the plurality of regions. In addition, each of the plurality of regions is defined by a corresponding relative refractive index and a corresponding radius In an embodiment of the present disclosure, the relative refractive index of each of the plurality of regions of the core 102 is different. In an embodiment of the present disclosure, the radius of each of the plurality of regions of the core 102 is different.

In addition, the refractive index profile of the core 102 of the few mode optical fiber 100 changes from center of the few mode optical fiber 100 to the radius of the core 102. Further, the relative refractive index of each of the plurality of regions of the core 102 has a pre-defined value. Furthermore, the radius of each of the plurality of regions of the core 102 has a pre-defined value. In an embodiment of the present disclosure, the pre-defined values of the relative refractive index and radius is set to obtain low differential group delay and the effective refractive index difference between two guided mode maintained such a way that it results into low cross talk.

In an embodiment of the present disclosure, the relative refractive index of each region of the plurality of regions is fixed over a cross-sectional area of each region. In addition, the core 102 has the first annular region 104, the second annular region 106, and the third annular region 108. In an embodiment of the present disclosure, the plurality of regions includes the first annular region 104, the second annular region 106, and the third annular region 108. Further, the first annular region 104, the second annular region 106, the third annular region 108 are concentrically arranged. Furthermore, the second annular region 106 surrounds the first annular region 104. Moreover the third annular region 108 surrounds the second annular region 106. Also, the first annular region 104, the second annular region 106, and the third annular region 108 is associated with corresponding relative refractive index and radius.

In an embodiment of the present disclosure, the first annular region 104 is the central core region. In an embodiment of the present disclosure, the first annular region 104 in the core 102 of the few mode optical fiber 100 has super Gaussian profile. In addition, the first annular region 104 having super Gaussian shape will result in low bending loss and lower small angle scattering (low attenuation). Further, the expression used for super Gaussian profile for refractive index profile of the central core region of the few mode optical fiber 100 is as follow:

$$\Delta(r) = \Delta * \exp\left(-\left(\frac{r}{a}\right)^{\gamma}\right)$$

wherein, $r \leq r_1$;
where,
'r': radial position from center of the few mode optical fiber 100;
'a': rescale factor;
'γ': gamma is a positive number;
Δ: maximum relative refractive index of the first annular region 104.

In an embodiment of the present disclosure, the first annular region 104 has a super Gaussian profile. In addition, the first annular region 104 has a rescale factor (a) and gamma (γ). In an embodiment of the present disclosure, rescale factor (a) is in range of about 6.6 microns to 7.2 microns and curve parameter gamma (γ) is in the range of about 4 to 8. In an example, the rescale factor (a) is about 6.9 microns and curve parameter gamma ( _ ) is about 6.

In an embodiment of the present disclosure, the parameters, the relative refractive index and radius of the first annular region 104, the second annular region 106 and the third annular region 108 are optimized for low differential group delay and the effective refractive index difference between two guided mode maintained such a way that it results into low cross talk of the few mode optical fiber 100.

In an embodiment of the present disclosure, the first annular region 104 lies between the central longitudinal axis 112 of the few mode optical fiber 100 and a first radius $r_1$ from the central longitudinal axis 112 of the few mode optical fiber 100. The first annular region 104 has a first relative refractive index $\Delta_1$. In addition, the second annular region 106 is between the first radius $r_1$ and a second radius $r_2$ from the central longitudinal axis 112 of the few mode optical fiber 100. The second annular region 106 has a second relative refractive index $\Delta_2$. Further, the third annular region 108 is between the second radius $r_2$ and a third radius $r_3$ from the central longitudinal axis 112 of the few mode optical fiber 100. The third annular region 108 has a third relative refractive index $\Delta_3$.

The expression used for calculating the relative refractive index is produced below:

$$\Delta i = 100 \times \left( \frac{n_i^2 - n_{clad}^2}{2 \times n_i^2} \right)$$

wherein, i=1, 2, 3 regions;
 $n_i$: the maximum refractive index of the core region;
 $n_{clad}$: refractive index of cladding.
 $\Delta_i$: the relative refractive index difference and given in percentage.

In an embodiment of the present disclosure, the first annular region 104 in the core 102 of the few mode optical fiber 100 has the first radius $r_1$ in range of about 14 microns to 16 microns. In another embodiment of the present disclosure, range of the first radius $r_1$ of the first annular region 104 in the core 102 of the few mode optical fiber 100 may vary. The first annular region 104 in the core 102 of the few mode optical fiber 100 has the first relative refractive index $\Delta_1$ in range of about 0.50 to 0.70. In another embodiment of the present disclosure, range of the first relative refractive index $\Delta_1$ of the first annular region 104 in the core 102 of the few mode optical fiber 100 may vary. In an example, the first annular region 104 in the core 102 of the few mode optical fiber 100 has the first radius $r_1$ of about 15 microns and the first relative refractive index $\Delta_1$ of about 0.6.

In an embodiment of the present disclosure, the second annular region 106 in the core 102 of the few mode optical fiber 100 has the second radius $r_2$ in the range of about 17 microns to 22 microns. In another embodiment of the present disclosure, range of the second radius $r_2$ of the second annular region 106 in the core 102 of the few mode optical fiber 100 may vary. In an embodiment of the present disclosure, the second annular region 106 in the core 102 of the few mode optical fiber 100 has the second relative refractive index $\Delta_2$ in range of about −0.01 to 0.01. In another embodiment of the present disclosure, range of the second relative refractive index $\Delta_2$ of the second annular region 106 in the core 102 of the few mode optical fiber 100 may vary. In an example, the second annular region 106 in the core 102 of the few mode optical fiber 100 has the second radius $r_2$ of about 19 microns and the second relative refractive index $\Delta_2$ of about zero.

In an embodiment of the present disclosure, the third annular region 108 in the core 102 of the few mode optical fiber 100 has the third radius $r_3$ in the range of about 24 microns to 30 microns. In another embodiment of the present disclosure, range of the third radius $r_3$ of the third annular region 108 in the core 102 of the few mode optical fiber 100 may vary. In an embodiment of the present disclosure, the third annular region 108 in the core 102 of the few mode optical fiber 100 has the third relative refractive index $\Delta_3$ in range of about −0.27 to −0.32. In another embodiment of the present disclosure, range of the third relative refractive index $\Delta_3$ of the third annular region 108 in the core 102 of the few mode optical fiber 100 may vary. In an example, the third annular region 108 in the core 102 of the few mode optical fiber 100 has the third radius $r_3$ of about 26 microns and the third relative refractive index $\Delta_3$ of about −0.29.

In an embodiment of the present disclosure, the first annular region 104 is the central core region, the second annular region 106 is the buffer region and the third annular region 108 is a trench region. The trench region is a down dopant region in the few mode optical fiber 100. The down dopant is a type of dopant that has the tendency to decrease the refractive index of glass with respect to pure silica. The central core region is an up dopant region in the few mode optical fiber 100. The up dopant is a type of dopant that has the tendency to increase the refractive index of glass with respect to pure silica.

In an embodiment of the present disclosure, the few mode optical fiber 100 includes the cladding 110. The cladding 110 surrounds the core 102. In addition, the cladding 110 is concentrically arranged around the core 102. Further, the cladding 110 is defined by a specific relative refractive index and a specific radius. In an embodiment of the present disclosure, the relative refractive index 110 is optimized for achieving the low differential group delay and the effective refractive index difference between two guided mode maintained such a way that it results into low cross talk. Furthermore, the cladding 110 is a region that lies between the third radius $r_3$ and the fourth radius $r_4$ of the few mode optical fiber 100. The cladding 110 concentrically surrounds the third annular region 108.

In an embodiment of the present disclosure, the cladding 110 has the fourth radius $r_4$ in range of about 62.2 microns to 62.8 microns. In another embodiment of the present disclosure, range of the fourth radius $r_4$ of the cladding 110 of the few mode optical fiber 100 may vary. In an embodiment of the present disclosure, the cladding 110 of the few mode optical fiber 100 has a fourth relative refractive index $\Delta_4$. In addition, the fourth relative refractive index $\Delta_4$ is zero. In another embodiment of the present disclosure, the fourth relative refractive index $\Delta_4$ of the cladding 110 of the few mode optical fiber 100 may vary. In an example, the cladding 110 has the fourth radius $r_4$ of about 62.5 microns and fourth relative refractive index $\Delta_4$ of about zero.

In an embodiment of the present disclosure, the refractive index profile of the core 102 of the few mode optical fiber 100 is achieved by using an up-dopant material like Ge. In another embodiment of the present disclosure, the up-dopant material may vary. In addition, the cladding 110 of the few mode optical fiber 100 is made of a material pure silica. In another embodiment of the present disclosure, the material of the cladding 110 of the few mode optical fiber 100 may vary. In an embodiment of the present disclosure, trench delta can be achieved by the down dopant material like flourine. In another embodiment of the present disclosure, the down dopant material may vary.

Figure 2:
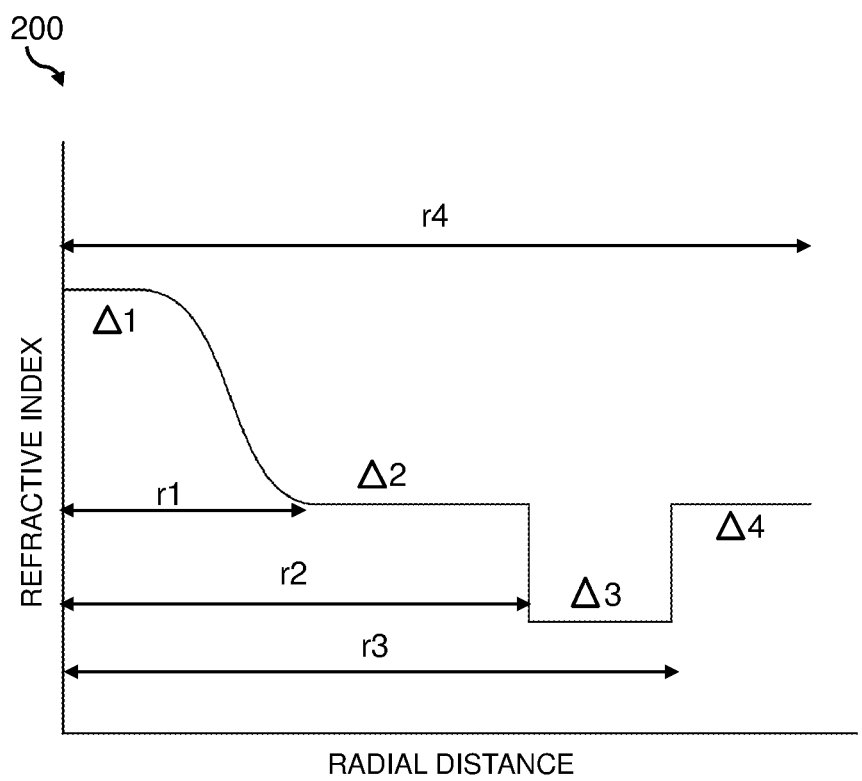
FIG. 2 illustrates a refractive index profile of the few mode optical fiber, in accordance with various embodiments of the present disclosure.

FIG. 2 illustrates a refractive index profile 200 of the few mode optical fiber 100, in accordance with various embodiments of the present disclosure. It may be noted that to explain a graphical appearance of the refractive index profile 200, references will be made to the structural elements of the few mode optical fiber 100. The refractive index profile 200 illustrates a relationship among the relative refractive index of the few mode optical fiber 100 and the radius of the few mode optical fiber 100 (as stated above in the detailed description of the FIG. 1). In an embodiment of the present disclosure, the refractive index profile 200 shows the change in the relative refractive index of the few mode optical fiber 100 with the radius of the few mode optical fiber 100.

In an embodiment of the present disclosure, the few mode optical fiber 100 has a differential group delay between two guided modes, LP01 and LP11. In general, differential group delay is difference in propagation time of between two guided modes. In an embodiment of the present disclosure, the differential group delay of the few mode optical fiber 100 is difference in propagation time between the two guided modes LP01 and LP11 of the few mode optical fiber 100. In an embodiment of the present disclosure, the differential group delay between the two guided modes LP01 and LP11 of the few mode optical fiber 100 is about 0.07 nanosecond/kilometer at wavelength of 1550 nanometer. In addition, the differential group delay between the two guided modes LP01 and LP11 of the few mode optical fiber 100 is less than 1 nanosecond/kilometer in the wavelength range of about 1400 nanometer to 1650 nanometer. In another embodiment of the present disclosure, the differential group delay between the two guided modes LP01 and LP11 of the few mode optical fiber 100 may vary.

In an embodiment of the present disclosure, the few mode optical fiber 100 has a dispersion in the range of 18 picosecond/(nanometer-kilometer) to 23 picosecond/(nanometer-kilometer) for LP01 guided mode and 13 picosecond/(nanometer-kilometer) to 16 picosecond/(nanometer-kilometer) for LP11 guided mode at wavelength of 1550 nanometer. In another embodiment of the present disclosure, the dispersion of two guided modes LP01 and LP11 of the few mode optical fiber 100 may vary. In an example of the present disclosure, the few mode optical fiber 100 has a dispersion in the range of 21.2 picosecond/(nanometer-kilometer) for LP01 guided mode and 14.5 picosecond/(nanometer-kilometer) for LP11 guided mode at wavelength of 1550 nanometer.

In an embodiment of the present disclosure, the few mode optical fiber 100 has a cutoff wavelength. In addition, the cutoff wavelength of the few mode optical fiber 100 is up to 1600 nanometer for LP02 guided mode and up to 2400 nanometer for LP11 guided mode. In another embodiment of the present disclosure, the cutoff wavelength of LP02 mode and LP11 guided mode of the few mode optical fiber 100 may vary. In an example the cutoff wavelength of the few mode optical fiber 100 is about 1340 nanometer for LP02 guided mode and up to 2118 nanometer for LP11 guided mode.

In an embodiment of the present disclosure, the difference between the effective refractive indexes of two guided modes LP01 and LP11 in the few mode optical fiber 100 is greater than $10^{-3}$. In another embodiment of the present disclosure, the difference between the effective refractive indexes of two guided mode LP01 and LP11 of the few mode optical fiber 100 may vary. In an example of the present disclosure, the difference between the effective refractive indexes of two guided modes LP01 and LP11 in the few mode optical fiber 100 is about $2.47*10^{-3}$. In general, cross talk is the undesired signals in a communication channel caused due to the transference of energy from another communication channel.

The present disclosure provides numerous advantages over the prior art. In addition, the few mode optical fiber is operated in LP01 guided mode and LP11 guided mode. Moreover, the few mode optical fiber has low differential group delay of 0.07 nanosecond/kilometer at wavelength of 1550 nanometer between the two guided modes LP01 and LP11. Also, the few mode optical fiber has the differential group delay less than 1 nanosecond/kilometer in the wavelength range of 1400 nanometer to 1650 nanometer.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A few mode optical fiber (100) comprising:
   a core (102), wherein the core (102) is defined by a region around a central longitudinal axis (112) of the few mode optical fiber (100), wherein the core (102) has a super Gaussian refractive index profile with curve parameter gamma γ comprising:
   a first annular region (104), wherein the first annular region (104) lies between the central longitudinal axis (112) of the few mode optical fiber (100) and a first radius $r_1$, wherein the first annular region (104) has a first relative refractive index $\Delta_1$, wherein the first radius $r_1$ is in a range of about 14 microns to 16 microns and the first relative refractive index $\Delta_1$ is in a range of about 0.50 to 0.70, wherein the first annular region (104) has a super Gaussian profile with curve parameter gamma γ is in a range of 4 to 8 and rescale factor (a) is in a range of about 6.6 microns to T2 microns;
   a second annular region (106), wherein the second annular region (106) concentrically surrounds the first annular region (104), wherein the second annular region (106) lies in between the first radius $r_1$ and a second radius $r_2$, wherein the second annular region (106) has a second relative refractive $\Delta_2$, wherein the second radius $r_2$ is in a range of about 17 microns to 22 microns and the second relative refractive index $\Delta_2$ is in a range of about −0.01 to 0.01;
   a third annular region (108), wherein the third annular region (108) concentrically surrounds the second annular region (106), wherein the third annular region (108) lies between the second radius $r_2$ and a third radius $r_3$, wherein the third annular region (108) has a third relative refractive index $\Delta_3$, wherein the third radius $r_3$ is in a range of 24 microns to 30 microns, wherein the third relative refractive index $\Delta_3$ is in a range of −0.27 to −0.32;
   a cladding (110), wherein the cladding (110) concentrically surrounds the third annular region (108), wherein the cladding (110) lies between the third radius $r_3$ and a fourth radius $r_4$, wherein the cladding (110) has a fourth relative refractive index $\Delta_4$, wherein the fourth radius $r_4$ is in a range of about 62.2 microns to 62.8 microns and the fourth relative refractive index $\Delta_4$ is zero, wherein relative refractive index and the parameters are optimized to achieve and low differential group delay between LP01 guided mode and LP 11 guided mode.

2. The few mode optical fiber (100) as claimed in claim 1, wherein the few mode optical fiber (100) has a dispersion of 13 picosecond/(nanometer-kilometer) to 16 picosecond/(nanometer-kilometer) for LP11 guided mode at a wavelength of 1550 nanometer.

3. The few mode optical fiber (100) as claimed in claim wherein the few mode optical fiber (100) has a dispersion of 18 picosecond/(nanometer-kilometer) to 23 picosecond/(nanometer-kilometer) for LP01 guided mode at a wavelength of 1550 nanometer.

4. The few mode optical fiber (100) as claimed in claim 1, wherein the few mode optical fiber (100) has a difference between an effective refractive index of the LP01 guided mode and LP11 guided mode at a wavelength of 1550 nanometer that is greater than $10^{-3}$.

5. The few mode optical fiber (100) as claimed in claim 1, wherein a cutoff wavelength for LP11 guided mode is up to 2400 nanometer.

6. The few mode optical fiber (100) as claimed in claim 1, wherein a cutoff wavelength for LPO2 mode is up to 1600 nanometer.

7. The few mode optical fiber (100) as claimed in claim 1, wherein the differential group delay between LP01 guided mode and LP11 guided mode is less than 1 nanosecond kilometer at a wavelength of 1550 nanometer.

\* \* \* \* \*